May 2, 1939.  L. MARCOLIVIO  2,156,505
WINDSHIELD WIPER
Filed July 21, 1937
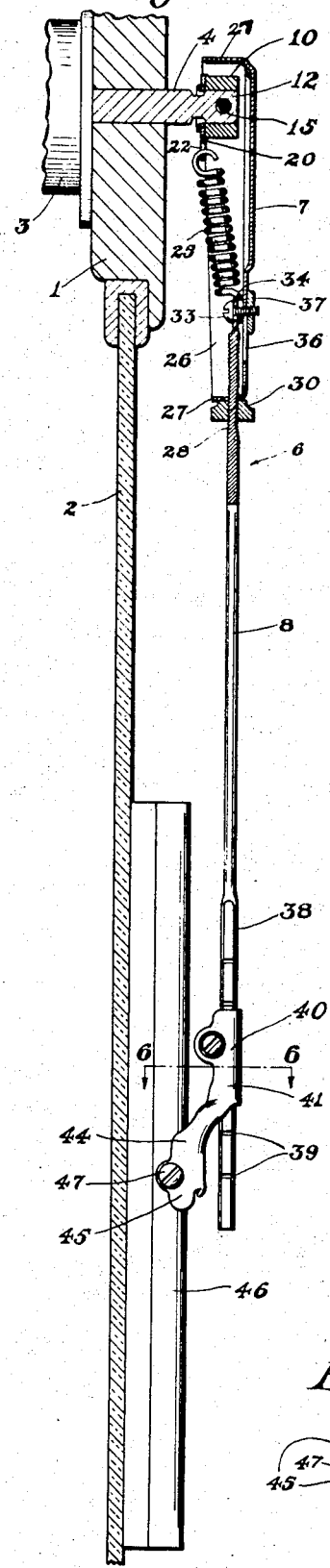
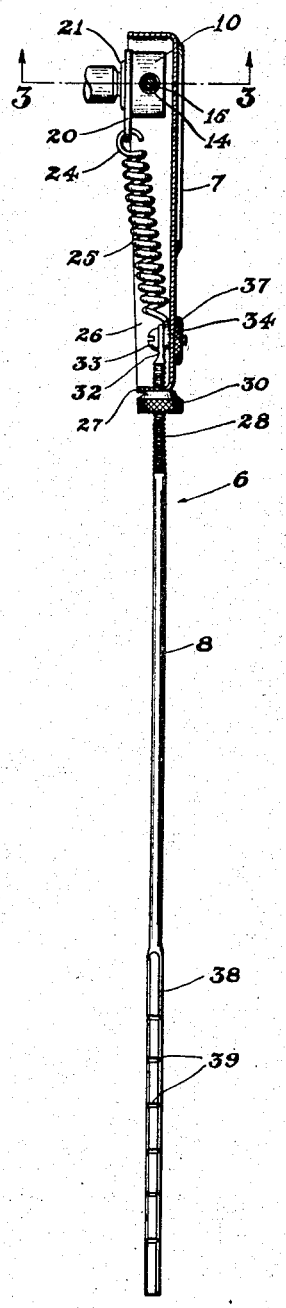
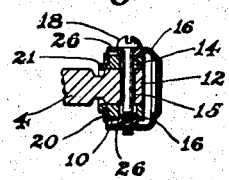
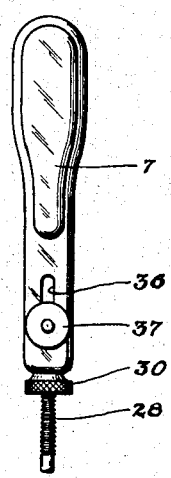
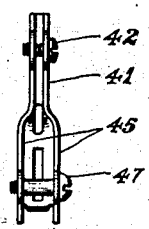
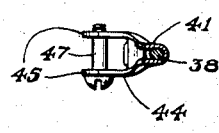
LOUIS MARCOLIVIO
INVENTOR
BY Perley H. Plant
ATTORNEY Patented May 2, 1939

2,156,505

UNITED STATES PATENT OFFICE 2,156,505

WINDSHIELD WIPER

Louis Marcolivio, Providence, R. I., assignor to Adelaine Romano, Providence, R. I.

Application July 21, 1937, Serial No. 154,773

2 Claims. (Cl. 287—62)

This invention relates to windshield wipers, and more particularly to improved means for supporting the wiper arm from the motor shaft and tensioning the same to regulate the pressure upon the wiper blade.

One object of the invention is the provision of means for resiliently connecting a wiper arm to the motor shaft through a tensioning means to exert pressure upon the wiper blade for forcing it against the windshield glass.

Another object of the invention is the provision of means for regulating the degree of tension applied to the wiper blade and maintaining the same substantially constant when desired.

A further object of the invention is the provision of a sectional wiper arm formed of adjustably connected sections capable of adjustment relative to each other and provided with means for maintaining the same in adjusted relation.

Another object of the invention is the provision of a novel form of connecting means between the wiper arm and wiper blade permitting relatively wide adjustment of the wiper blade longitudinally of the wiper arm and providing for the elimination of a portion of the wiper arm extending below the connecting means.

A further object of the invention is the provision of novel means for connecting the wiper arm with the motor shaft providing a pivotal support for the wiper arm and including the provision of means for exerting tension upon the wiper arm in a direction towards the plane of the windshield.

Other objects and advantages of the invention relate to various improved details of construction and novel arrangements of the parts as will be more fully set forth in the detailed description to follow.

Referring to the drawing:

Fig. 1 is a fragmentary sectional view through a portion of an automobile windshield showing the location of a wiper actuating motor and a wiper arm carried thereby, portions of the wiper arm being shown in section, and portions of the wiper arm and the wiper blade being shown in side elevation in operative relation with the windshield glass, Fig. 2 is a view of the wiper arm showing its connection with the motor shaft in side elevation and illustrating the position of the arm sections when the same are arranged to provide for increased tension upon the wiper blade, Fig. 3 is a detail sectional view, taken substantially along the line 3—3 of Fig. 2, and showing the arrangement of the parts for providing a mounting for the wiper arm upon the motor shaft, Fig. 4 is a front elevational view of a portion of the wiper arm showing the cover or casing section forming a part of the wiper arm and a portion of the shaft section, Fig. 5 is a bottom plan view of the connecting member for connecting the wiper blade to the lower end portion of the wiper arm, and, Fig. 6 is a transverse sectional view of the blade connecting member, taken substantially along the line 6—6 of Fig. 1.

In the embodiment of the invention illustrated herewith 1 designates a portion of the frame of an automobile located adjacent to and supporting the windshield glass 2. A motor 3 of any suitable character may be carried by the frame portion 1 and operated in any desired manner to oscillate a motor shaft 4 projecting through the frame 1 and extending forwardly thereof a sufficient distance for supporting a wiper arm in operative relation with the windshield glass.

The wiper arm 6 may comprise a cover or casing section 7 and a shaft section 8 which have overlying or telescoping portions capable of longitudinal adjustment relative to each other whereby the effective length of the wiper arm may be varied somewhat as well as the tension applied to the wiper arm for holding the wiper blade against the surface of the windshield glass.

The casing or cover section 7 of the wiper arm may be pivotally supported from the motor shaft 4 by means of a connecting member 10, which, in the present instance, is in the form of a sleeve adapted to fit substantially over the end portion 12 of the motor shaft 4, and which is provided with oppositely positioned registering openings 14 in alignment with a transverse opening 15 formed in the end portion 12 of the motor shaft 4. The registering openings 14 formed in the sleeve may be of somewhat larger diameter than the transverse opening 15 in the end 12 of the motor shaft to provide room for receiving hollow trunnions 16 struck in from opposite sides of the body of the casing or cover 7 and which serve as pivots for hingedly supporting the cover or casing 7 relative to the connecting member 10. A screw 18 or other suitable means may be passed through one of the oppositely positioned inturned hollow trunnions 16, the registering openings 14 in the connecting member 10 and the transverse opening 15 formed in the end 12 of the motor shaft and into threaded engagement with the other hollow trunnion 16 to hold the parts in suitable relation with each other and provide a pivotal mounting for the cover section or casing 7 relative to the motor shaft.

A plate 20 is supported by the connecting member 10 adjacent to the inner face thereof in any suitable manner, as by means of an expanded rim 21, which plate 20 is provided with an opening 22 for receiving one end 24 of a coiled tension spring member 25 for a purpose which will be more fully set forth hereinafter.

The casing member 7 is provided with inturned side and end walls 26 and 27, one of the end walls 27 being provided with an opening for receiving the threaded end portion 28 of the arm section 8 which carries an adjusting nut 30. The extreme end portion of the threaded end 28 may be flattened, as indicated at 32, and provided with an opening to receive a set screw 33 passed through the opening in the flattened end portion 32 and through a bent end 34 of the tension member 25 to extend through a slot 36 formed in the cover or casing member 7 and have applied thereto a locking nut 37 which is adapted to bear against the outer face of the casing or cover member 7, and hold the parts securely in adjusted position.

Wiper blades now in use are of various different types and constructions, and each type may be said to work most efficiently under the pressure best adapted for that particular construction. Heretofore, there has been no readily operated means for adjusting the pressure to secure that best adapted for the particular type of blade employed. The above construction provides for adjusting the length of the wiper arm through the adjustable connection of the sections, and also for increasing or decreasing the amount of pressure applied to the wiper blade by the tension spring 25 for forcing the wiper blade against the glass of the windshield.

This construction also provides for setting the parts when adjusted so that the wiper blade may be operated without substantial change in pressure until such time as it may be necessary to change the blade or modify the pressure to compensate for wear or meet changed weather conditions. In setting the parts for obtaining the desired pressure, the nut 30 may first be turned against the end 27 of the casing until the desired degree of pressure against the wiper blade is obtained. The nut 37 may then be tightened to clamp the parts firmly in position and maintain a substantially uniform pressure on the wiper blade until change in pressure is desired. In making such change, the nut 37 is first turned to release the parts, when the nut 30 may be rotated to increase or decrease the tension on the spring member 25 and thus increase or decrease the pressure on the blade. When the desired pressure is obtained the nut 37 may be again turned to secure the parts against relative movement and maintain the pressure upon the blade substantially constant.

The lower end portion 38 of the rod 8 is preferably square or rectangular in cross section and provided with a plurality of transverse grooves 39 to form weakened portions. A connecting member 40 is provided with a narrow channel portion 41 for receiving the angular end portion 38 of the rod 8 and a set screw 42 is passed through the opposite sides of the channel portion 41 for clamping the same securely in position to the angular portion 38 of the rod. The connecting member 40 has an offset portion 44 which may comprise spaced opposed flanges 45 adapted to receive therebetween a portion of a wiper blade 46 which may be secured thereto by means of a bolt or screw 47 passed through the opposed flanges 45 for suitably mounting the wiper blade and holding it in wiping position relative to the windshield glass 2.

The provision of the weakened lines 39 formed in the squared or rectangular portion 38 of the arm permits the breaking off of one or more sections from the free end of the portion 38 of the arm after the wiper blade has been secured thereto in the desired position, when one or more of such weakened lines extends beyond the end of the channel portion 41, as is shown in Fig. 1 of the drawing.

The wiper arm 6 is pivotally connected to the end portion 12 of the motor shaft so that it may be moved through an arc at substantially right angles to the plane of the windshield glass when it is desired to raise the same from the glass for any purpose.

The provision of the connecting member 10 in the form of a sleeve and the manner of connecting thereto the cover member 7 provides a simple and efficient mounting for the wiper arm which in connection with the tension member 25 and adjustable connection between the wiper arm sections renders it possible to vary the tension upon the wiper blade throughout wide limits to allow for obtaining any suitable or desired tension upon the wiper blade whereby the same is adapted for use in connection with various forms of wiper blade requiring different degrees of pressure for their operation on the windshield glass.

What I claim is:

1. In a windshield wiper structure, a wiper arm comprising longitudinally adjustable sections, a tension spring for moving said sections relative to each other in one direction, means threaded upon one of said sections and bearing against the other of said sections for moving said sections relative to each other in an opposite direction, and means for retaining said sections in adjusted position relative to each other.

2. In a windshield wiper structure, a wiper arm comprising a casing section having front, side and end walls, a second section slidably mounted in one of the end walls of said first section, means threaded upon said last named section and bearing against the other of said sections for moving said sections relative to each other in one direction, and means carried by said first named section engageable with said second section for retaining said sections in fixed relation with each other.

LOUIS MARCOLIVIO.